United States Patent Office 2,865,764
Patented Dec. 23, 1958

2,865,764

PROCESS OF PRESERVING FOOD PRODUCTS AND COMPOSITION THEREFOR

Henry J. Gorsica, Fort Atkinson, Wis., and William J. Zick, Crete, Ill., assignors to B. Heller & Company, a corporation of Illinois No Drawing. Application September 19, 1956
Serial No. 610,712

10 Claims. (Cl. 99—150)

This invention relates to mold-inhibiting compositions adapted to be applied in substantially dry form to food products and in particular to meat, cheese and other proteinaceous products, for the prevention of growth of micro-organisms including molds in and on the food products or the products associated therewith which normally foster the growth of such micro-organisms.

The mold-inhibiting compositions of the invention are specially useful for application as dry coatings in association with meat and cheese products at preparing and packing plants, such products including beef, pork, veal and lamb products, hams, bacon, sausage of the all-meat type or mixed with cereal and processed milk combinations, cheese, poultry, etc. The composition in substantially dry form is adapted to be rubbed into the surface of the proteinaceous product in small amounts which prevent mold growth under contaminating conditions without impairing flavor, color, odor or appearance of the food product.

The composition may also be applied below the surface of the food product in aqueous solution, although this mode of application may not be so convenient as the application in dry powder form for packing plant or home use. The results obtained are better, however, when the composition is applied to the food products as a dry powder to cover the same.

The composition may also be applied as a coating to wrapping materials for food products. For example, the wrapping material, such as vegetable parchment, paper, cellophane, Pliofilm, and the like may be dipped into an aqueous solution of the composition to be impregnated thereby with from 10–15% of the component making up the composition and thereby render the wrapping material mold-inhibiting and more sanitary for use in wrapping these food products.

For example, in the treating of bacon, the dry composition containing about 50% of an inert solid diluent, salt, is applied by rubbing in an amount of about 1 pound of dry composition for 100 pounds of bacon. This composition containing only 50% of the active ingredients is thus suitable to completely inhibit mold growth under heavy conditions of contamination by completely covering from 2500–4500 square inches of bacon surface with 1 pound of the composition.

The compositions in accordance with the invention comprise, as the effective mold-inhibiting components, sodium bicarbonate in intimate admixture with either sorbic acid or sodium diacetate or with sorbic acid and sodium diacetate. These combinations of two-component and three-component mixtures have been found, surprisingly, to exhibit a mold-inhibiting action which is far greater than would be expected from the additive mold-inhibiting action of the ingredients in the same proportions applied to the food product under the same conditions.

For the purpose of preventing mold-inhibition, the present discovery of unexpected improvement in the mold-inhibiting action of sorbic acid by incorporating the same with sodium bicarbonate in the compositions of the present invention provides a new and practical means for combating damage to food products by the action of molds.

In the preferred compositions in dry powder form which are applied to meat and cheese products by rubbing according to the invention, the amounts of the principal ingredient, sodium bicarbonate, in combination with one or more sorbic acid and sodium diacetate, may vary widely while retaining the mold-inhibiting effectiveness of the composition.

For reasons of economy and ease of application, it is preferred that the dry ingredients be mixed in the presence of a suitable inert diluent, common salt (sodium chloride) being preferred since it of itself exhibits no deleterious action and permits ready control for bringing effective mold-inhibiting concentrations of the synergistically acting ingredients into association with the food product to protect it against mold formation and growth.

Thus, 90% of salt and 10% of bicarbonate of soda may be formulated in a 1–2 pound dry batch to which 1.0 gram of sorbic acid or 2.0 grams of sodium diacetate or 1 and 2 grams of each of these, respectively, are added to the salt-diluted bicarbonate powder.

Conversely, the proportion may be about 90% of sodium bicarbonate and 10% of inert diluent salt to which these potentiating additions are made.

Preferably, the proportion of bicarbonate of soda is between about 15% to about 75% by weight of the total with the remaining 15% to 25% being the inert salt diluent.

It is recognized that by chemical reaction between sorbic acid and sodium bicarbonate amounts of sodium sorbate may be produced. The same mold-inhibiting results achieved by adding the sorbic acid in the amounts specified, i. e., about 1 to 2 grams per pound of sodium bicarbonate and salt, will be likewise achieved by adding the equivalent amount of sodium sorbate. The difference in acidity is negligible between compositions formulated with the acid and with the sodium salt in view of the large mass of bicarbonate and salt. However, the formulation is based upon the addition of the acid, sorbic acid, rather than the salt, since the former is readily commercially available whereas the latter is not. The composition of the invention is, therefore, to be construed with respect to the sorbic acid ingredient as containing this ingredient added either as the free acid or as a food compatible salt thereof, preferably the sodium salt.

The amount of sorbic acid is at least 1.0 gram, preferably 2 grams, per pound of dry preparation of bicarbonate and salt and not more than about 4.0 grams per pound of preparation. More than this quantity is wasteful of the material and does not improve the mold-inhibiting characteristics of the composition.

The amount of sodium diacetate is at least 0.5 gram, preferably 1.0 gram, and not more than about 3.5 grams per pound of dry preparation since beyond this concentration no further increase of inhibiting action is observed commensurate with the added expense of the excess.

Optimum added amounts of sorbic acid and sodium diacetate are about the same as above, whether they are added together as double additives or separately as single additives to the bicarbonate of soda and salt-diluted powder base. However, the synergistic effect in the composition containing the double additive is better than the inhibiting effect with either of the single additives even if the concentrations of the single additives are doubled.

Conveniently and if desired, coloring matter, such as paprika, spices and seasoning and other of the usual food additives commonly employed in pre-cooking food products or in flavoring processed meat and cheese products prior to cooking may be added to the dry formulation.

If a coloring matter such as paprika is added, which incidentally has no mold-inhibiting effectiveness per se, small amounts up to considerable amounts may be added; in fact, from 5% to 90% depending upon the degree of coloration which is to be imparted to the food product and to satisfy the desire of the person for the shade of final coloration. Other food coloring materials, natural or synthetic, may obviously be used with the advantage of serving as a "tell-tale" component to indicate, particularly where the colorless or white product may not show up against the meat or cheese food background, those areas of dry powder application which have been assuredly covered.

In order to demonstrate the improved results obtained in accordance with this invention, a number of additional tests were made, as illustrated in the following examples, which are not intended to limit the invention.

*Example 1*

The following dry compositions were mixed in one pound avoirdupois batches.

A. Salt—1 pound
B. Sodium bicarbonate—½ pound
   Salt (NaCl)—½ pound
C. Salt—1 pound
   Sorbic acid—1 gram
D. Salt—1 pound
   Sodium diacetate—2 grams
E. Salt—½ pound
   Sodium bicarbonate—½ pound
   Sorbic acid—1 gram
F. Salt—½ pound
   Sodium bicarbonate—½ pound
   Sodium diacetate—2 grams
G. Salt—½ pound
   Sodium bicarbonate—½ pound
   Sorbic acid—1 gram
   Sodium diacetate—2 grams
H. Salt—1 pound
   Sorbic acid—1 gram
   Sodium diacetate—2 grams The above dry compositions applied to meaty products illustrate the surprising potentiation or synergism observed by bringing the ingredients together in the manner taught by the invention.

The applications of the above dry compositions to bacon samples of uniform size were carried out by rubbing these ingredients into the bacon surface at 1 pound of dry agent to 100 pounds of bacon, and thereafter observing the development of mold after placing the samples under a bell jar at 95% relative humidity, in which bell jar there was placed a heavy contamination of mold and comparing the same with a control sample of bacon to which non-mold inhibiting salt containing no agent had been applied.

Bacon Sample 1.—100% salt control—no mold—inhibiting agent applied—dry composition A.
Bacon Sample 2.—Sodium bicarbonate, ½ pound; ½ pound salt as inert carrier; dry composition B.
Bacon Sample 3.—Sorbic acid, 1 gram, in 1 pound of salt as inert carrier; dry composition C.
Bacon Sample 4.—Sodium diacetate, 2 grams, in 1 pound of salt as inert carrier; dry composition D.
Bacon Sample 5.—Sodium bicarbonate, ½ pound; sorbic acid; 1 gram; ½ pound salt as inert carrier; dry composition E.
Bacon Sample 6.—Sodium bicarbonate, ½ pound; sodium diacetate, 2 grams, ½ pound salt as inert carrier; dry composition F.
Bacon Sample 7.—Sodium bicarbonate, ½ pound; sodium diacetate, 2 grams; sorbic acid, 1 gram; ½ pound salt as inert carrier; dry composition G.
Bacon Sample 8.—Sorbic acid, 1 gram; sodium diacetate, 2 grams; 1 pound salt as inert carrier; dry composition H.

After 48 hours under the very heavy mold contamination, the following developments were observed:

Sample 1.—Control—very heavy luxuriant mold growth covering entire surface of bacon.
Sample 2.—1 to 2 mold colonies observed on separate pieces of bacon.
Sample 3.—3 to 5 mold colonies observed on separate pieces of bacon.
Sample 4.—Heavy contamination, luxuriant mold growth over bacon surface, no better than control.
Sample 5.—No contamination, no mold growth on surface.
Sample 6.—No contamination, no mold growth on surface.
Sample 7.—No contamination, no mold growth on surface.
Sample 8.—Slight contamination—about 3 to 5 mold colonies.

After 96 hours, the samples being undisturbed, the following was observed with respect to Samples 2, 3, 5-8.

Sample 2.—Slight contamination, spreading of few mold colonies as compared with 48 hours.
Sample 3.—Heavy contamination, about 10 to 20 mold colonies, furry growth.
Sample 5.—No mold growth.
Sample 6.—No mold growth.
Sample 7.—No mold growth.
Sample 8.—Moderately heavy contamination, surfaces covered with intermingling mold spots.

After 120 hours the following results were observed for these samples:

Sample 2.—Further development of mold and spreading as compared with 96 hours.
Sample 3.—Very heavy contamination.
Sample 5.—Very slight contamination; 1 to 2 colonies.
Sample 6.—No contamination.
Sample 7.—No contamination.
Sample 8.—Very heavy contamination.

After 192 hours, following are the results:

Sample 2.—Greater growth than at 120 hours.
Sample 3.—Heavy contamination.
Sample 5.—Slight contamination, little more than at 120 hours.
Sample 6.—Very slight contamination.
Sample 7.—No contamination.
Sample 8.—Very heavy contamination.

Upon continuing the exposure of bacon Samples 6 and 7, it was found that after several more days a very slight contamination was observed with Sample 6 containing sodium diacetate as the second ingredient in combination with sodium bicarbonate whereas in Sample 7, in which added sorbic acid is present in addition to the ingredients of Sample 6, no contamination was observed.

The foregoing results demonstrate the following:

(1) Sorbic acid, a known mold-inhibitor (see U. S. Patent 2,379,294) is not effective alone; when applied as a substantially dry preservative in an inert carrier salt, significant mold growth occurred after 48 hours under the extremely heavy conditions of contamination under the bell jar.

(2) Sodium diacetate, having substantially no mold-inhibiting activity per se as demonstrated by behaviour similar to that of the control, surprisingly potentiates sodium bicarbonate in extremely small amounts to provide a mold-inhibiting mixture better than sodium bicarbonate alone, as demonstrated by the behaviour of Sample 6.

(3) Sorbic acid, ineffective to inhibit mold growth after 48 hours, potentiates sodium bicarbonate in admixture therewith, about 1 gram of sorbic acid in ½ pound of sodium bicarbonate, to provide a mold-inhibiting action in admixture greater than that realized by the same amounts which would be additively expected from the ingredients separately.

As seen after 96 hours in comparing Samples 3 and 5, the latter shows no substantial mold growth whereas the former shows heavy growth; this result which is obtained is greater than that which would be expected from the action of sorbic acid per se.

As seen by comparing Samples 2 and 5 with Sample 3 above, these after 96 and 120 hours, respectively, bicarbonate of soda alone is not as effective as when potentiated by sorbic acid in the small amount of 1 gram added. In the latter case, sorbic acid ineffective after 48 hours improves mold-inhibition beyond that attainable by sodium bicarbonate after 96–120 hours.

(4) Surprisingly, sorbic acid and sodium diacetate in the same amounts are ineffective after 96 hours, whereas the combination of these two in the presence of sodium bicarbonate remarkably potentiates sodium bicarbonate under heavy contamination for periods extending beyond 200 hours.

The combination of sodium bicarbonate, sorbic acid and sodium diacetate is found to be superior to both the combination (1) of sodium bicarbonate with sorbic acid and the combination (2) of sodium bicarbonate with sodium diacetate. These last three named compositions are far more effective, indeed greatly superior to sodium bicarbonate alone or to a combination of sorbic acid and sodium diacetate.

As demonstrated above under exposure testing at 96–120 hours, each of sorbic acid and sodium diacetate is per se substantially ineffective. Their improvement of the mold-inhibiting action in combination with sodium bicarbonate is therefore wholly unexpected.

*Example 2*

The dry, uniformly blended formulation set out below was applied by rubbing on a cured bacon slab at a rate of one pound of mold-inhibiting preparation per 100 pounds of bacon and compared under exposure to mold growth under a bell jar as in Example 1, to an untreated bacon slab of the same size and under the same bell jar at room temperature for the period indicated.

| | Grams |
|---|---|
| Salt | 218 |
| Sodium bicarbonate | 203 |
| Paprika | 43 |
| Sorbic acid | 2 |
| Sodium diacetate | 1 |

This formulation is similar to Example 1G except that food colorant, paprika, which exhibits no mold-inhibiting action per se, is added to the mixture.

After 8 days of exposure at room temperature to heavy mold contamination under the bell jar, the untreated cured bacon slab, the control slab, was completely contaminated over its entire surface with a luxuriant mold growth which penetrated below the surface of the cured bacon. In contrast, the bacon slab treated as specified with the composition of this example was free from any mold growth and retained substantially all of the desirable characteristics of the meat product at the time it was placed under the bell jar 8 days before.

*Example 3*

The following mold-inhibiting dry preparation was formulated and applied to bacon slabs by the procedure outlined in Example 2.

| | Grams |
|---|---|
| Salt | 150 |
| Sodium bicarbonate | 435 |
| Sorbic acid | 5.8 |
| Sodium diacetate | 5.8 |

The control bacon slab and treated bacon slab were subjected to heavy mold contamination under the procedure of Example 2 for 7 days.

Only a few colonies, pin-point in character, appeared on the treated bacon slab after 7 days. In contrast the control slab was completely contaminated with mold at the end of 7 days.

A second control was run in which sodium bicarbonate was used at the rate of 1 pound per 100 pounds of bacon with the same size slab. Moderate contamination, much heavier than with the bacon sample treated with the composition of this example, was observed. This again illustrates the superiority of the combination of sodium bicarbonate, sorbic acid and sodium diacetate to sodium bicarbonate per se.

*Example 4*

The following mold-inhibiting dry preparation was formulated and applied to bacon slags by the procedure outlined in Example 2.

| | Grams |
|---|---|
| Salt | 218 |
| Sodium bicarbonate | 203 |
| Paprika | 43 |
| Sorbic acid | 2 |

The control bacon slab and treated bacon slab were subjected to heavy mold contamination under the procedure of Example 2 for 7 days.

After 120 hours a slight contamination of mold started to appear on the surface of the treated slab as compared with heavy mold growth on a control. A second control slab treated with sodium bicarbonate in the same amount showed heavier contamination after 96 hours than with the treated sample.

*Example 5*

The following mold-inhibiting dry preparation was formulated and applied to bacon slabs by the precedure outlined in Example 2.

| | Grams |
|---|---|
| Salt | 218 |
| Sodium bicarbonate | 203 |
| Paprika | 43 |
| Sodium diacetate | 1 |

The control bacon slab and treated bacon slab were subjected to heavy mold contamination under the procedure of Example 2 for 7 days.

After 120 hours no contamination of mold appeared as contrasted with the slight contamination observed in Example 4. Very slight contamination began to appear after an additional 30–40 hours of exposure beyond the 120 hour period of exposure.

A second control slab treated with sodium bicarbonate in the same amount showed heavier contamination after 96 hours than with the treated sample.

The composition of this example appears to be better than that of Example 4 for the reason that it inhibits mold growth under longer periods of exposure.

Wrapping material for food products may be dipped into an aqueous solution of the compositions of the invention, for example, an aqueous solution of the composition described in Examples 2, 3, 4 and 5 is prepared and utilized for the dipping solution to impregnate parchment paper and similar wrapping material. A useful concentration of said aqueous solution contains about 10–20% of the ingredients by weight in water. The wrapping material dipped into this solution is impregnated with about 10–15% by weight of the mold-inhibiting ingredients. This wrapping material utilized as a wrapping for proteinaceous products such as cheese, meat or bacon serves to prevent mold growth in substantially the same manner as indicated above in Examples 2, 3, 4 and 5, when such wrapping material is subjected to storage conditions of heavy mold contamination.

We claim:

1. A process of inhibiting growth of molds on a proteinaceous edible product normally fostering such growth comprising applying to such product a mold inhibiting composition containing between about 10% and about 90% of sodium bicarbonate and between about 90% and 10% of salt as an inert diluent, the sodium bicarbonate and salt forming the basic constituents and in admixture therewith a potentiating member of the group consisting of sorbic acid, sodium diacetate and mixtures of sorbic acid and sodium diacetate, said sorbic acid being present in an amount between about 1 and about 4 grams per pound of basic constituents on a dry weight basis and said sodium diacetate being present in an amount between about 0.5 gram and about 3.5 grams per pound of basic constituents on a dry weight basis.

2. A process as defined in claim 1 in which the mold-inhibiting composition is incorporated into the product.

3. A process as defined in claim 1 in which the mold-inhibiting composition is applied by rubbing the mold-inhibiting coposition in dry form to the exterior of said product.

4. A process as defined in claim 1 in which the mold-inhibiting composition is applied to a wrapper for the product.

5. A mold-inhibiting composition adapted to be applied in substantially dry form to a proteinaceous food product for the prevention of growth of microorganisms, including molds therein and thereon, containing between about 10% and about 90% of sodium bicarbonate and between about 90% and 10% of salt as an inert diluent, said sodium bicarbonate and salt forming the basic constituents, in admixture with a potentiating member of the group consisting of sorbic acid, sodium diacetate and mixtures of sorbic acid and sodium diacetate, said sorbic acid being present in an amount between about 1 and about 4 grams per pound of basic constituents on a dry weight basis and said sodium diacetate being present in an amount between about 0.5 gram and about 3.5 grams per pound of basic constituents on a dry weight basis.

6. A mold-inhibiting composition as defined in claim 5 wherein sodium bicarbonate is combined with sorbic acid.

7. A mold-inhibiting composition as defined in claim 5 wherein sodium bicarbonate is combined with sodium diacetate.

8. A mold-inhibiting composition as defined in claim 5 wherein sodium bicarbonate is combined with sorbic acid and sodium diacetate.

9. A mold-inhibiting composition adapted to be applied in substantially dry form to proteinaceous food products for the prevention of growth of microorganisms, including molds therein and thereon, containing between about 10% and about 90% of sodium bicarbonate and between about 90% and 10% of salt as an inert diluent, said sodium bicarbonate and salt forming the basic constituents, in admixture with potentiating agents, sodium diacetate and sorbic acid wherein at least 0.5 gram of sodium diacetate and 1.0 gram of sorbic acid are present per pound of ingredients on a dry weight basis.

10. A composition as defined in claim 9 which additionally contains a food colorant, paprika, serving as a tell-tale ingredient for indicating areas in which the mold-inhibiting composition has been applied to a food product.

References Cited in the file of this patent

UNITED STATES PATENTS

| | | |
|---|---|---|
| 2,379,294 | Gooding | June 26, 1945 |
| 2,412,596 | Bauer et al. | Dec. 17, 1946 |
| 2,417,806 | Bauer et al. | Mar. 25, 1947 |

OTHER REFERENCES

"The Condensed Chemical Dictionary," 1942 by T. C. Gregory, published by Reinhold Publishing Corporation, 330 West Forty-Second Street, New York, page 581, article entitled "Sodium Bicarbonate."